US012600168B2

(12) United States Patent
Nusier et al.

(10) Patent No.: US 12,600,168 B2
(45) Date of Patent: Apr. 14, 2026

(54) WHEEL ASSEMBLY WITH ELLIPTICAL SPOKES

(71) Applicant: Ford Global Technologies, LLC, Dearborn, MI (US)

(72) Inventors: Saied Nusier, Canton, MI (US); Srinivasan Sundararajan, Ann Arbor, MI (US); Jamel E. Belwafa, Ann Arbor, MI (US); Rahul Arora, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 438 days.

(21) Appl. No.: 18/301,454

(22) Filed: Apr. 17, 2023

(65) Prior Publication Data

US 2024/0343062 A1     Oct. 17, 2024

(51) Int. Cl.
*B60B 9/26*          (2006.01)
*B60B 9/04*          (2006.01)
(52) U.S. Cl.
CPC . *B60B 9/26* (2013.01); *B60B 9/04* (2013.01)
(58) Field of Classification Search
CPC .... B60B 9/04; B60B 9/10; B60B 9/26; B60C 7/107; B60C 7/146; B60C 7/14
See application file for complete search history.

(56) References Cited

U.S. PATENT DOCUMENTS

| | | | | |
|---|---|---|---|---|
| 863,451 | A | | 8/1907 | Rowland |
| 889,782 | A | * | 6/1908 | Higgins .................... B60B 9/26 |
| | | | | 152/73 |
| 899,611 | A | * | 9/1908 | Parham ..................... B60B 9/26 |
| | | | | 152/76 |

(Continued)

FOREIGN PATENT DOCUMENTS

| | | | | | |
|---|---|---|---|---|---|
| CN | 109677197 | A | * | 4/2019 | ............. B60B 21/10 |
| CN | 209521484 | U | | 10/2019 | |

(Continued)

OTHER PUBLICATIONS

Ernö Dux et al., "A Mobile Deformable Barrier Test for the Front Crash Assessment of Future Urban Microcars", Paper No. 15-0343, he study presented within this document was executed within the EC co-financed project SafeEV (Safe Small Electric Vehicles through Advanced Simulation Methodologies)—www.project-safeev.eu.

*Primary Examiner* — Kip T Kotter
(74) *Attorney, Agent, or Firm* — Frank A. MacKenzie; Brooks Kushman P.C.

(57)          ABSTRACT

A wheel assembly includes a rim and a hub concentric with the rim. The wheel assembly includes a first set of spokes spaced circumferentially about the hub between the rim and the hub. The spokes of the first set of spokes each has an elliptical shape elongated in a direction radially from the hub to the rim. The wheel assembly includes a second set of spokes spaced circumferentially about the hub between the first set of spokes and the rim. The spokes of the second set of spokes each has a partial elliptical shape elongated in a direction radially from the hub to the rim. The spokes of the first set of spokes are in an alternating arrangement with spokes of the second set of spokes circumferentially about the hub.

14 Claims, 6 Drawing Sheets

(56)                References Cited

U.S. PATENT DOCUMENTS

| | | | | |
|---|---|---|---|---|
| 1,019,101 A * | 3/1912 | Strietelmeier | ............ | B60B 9/26 |
| | | | | 152/84 |
| 1,274,877 A * | 8/1918 | Hancock | ................... | B60B 9/26 |
| | | | | 152/84 |
| 1,365,181 A * | 1/1921 | Marzak | ..................... | B60B 9/08 |
| | | | | 152/73 |
| 1,471,452 A * | 10/1923 | Daubert | .................. | E01B 11/02 |
| | | | | 238/151 |
| 6,244,669 B1 * | 6/2001 | Braunschweiler | ........ | B60B 9/04 |
| | | | | 301/79 |
| 6,637,828 B2 | 10/2003 | Braunschweiler | | |
| 2020/0324571 A1 * | 10/2020 | Tardiff | ................... | B60C 7/146 |

FOREIGN PATENT DOCUMENTS

| | | | | | |
|---|---|---|---|---|---|
| CN | 114340909 A | | 4/2022 | | |
| DE | 10010680 A1 * | 9/2001 | | .......... | F16H 49/001 |
| JP | 2007118936 A * | 5/2007 | | .......... | B60B 1/0269 |
| WO | WO-2007137858 A2 * | 12/2007 | | .............. | B60C 7/18 |

* cited by examiner

WHEEL ASSEMBLY WITH ELLIPTICAL SPOKES

BACKGROUND

Three-wheeled vehicles are lightweight, affordable vehicles used in urban transportation. Three-wheeled vehicles can be designed to accommodate a single-occupant or multiple occupants. Three-wheeled vehicles may have features that control deformation of a body and/or frame of the vehicle and/or other external components of the vehicle in the event of certain vehicle impacts, e.g., certain frontal vehicle impacts.

DETAILED DESCRIPTION

Figure 1:
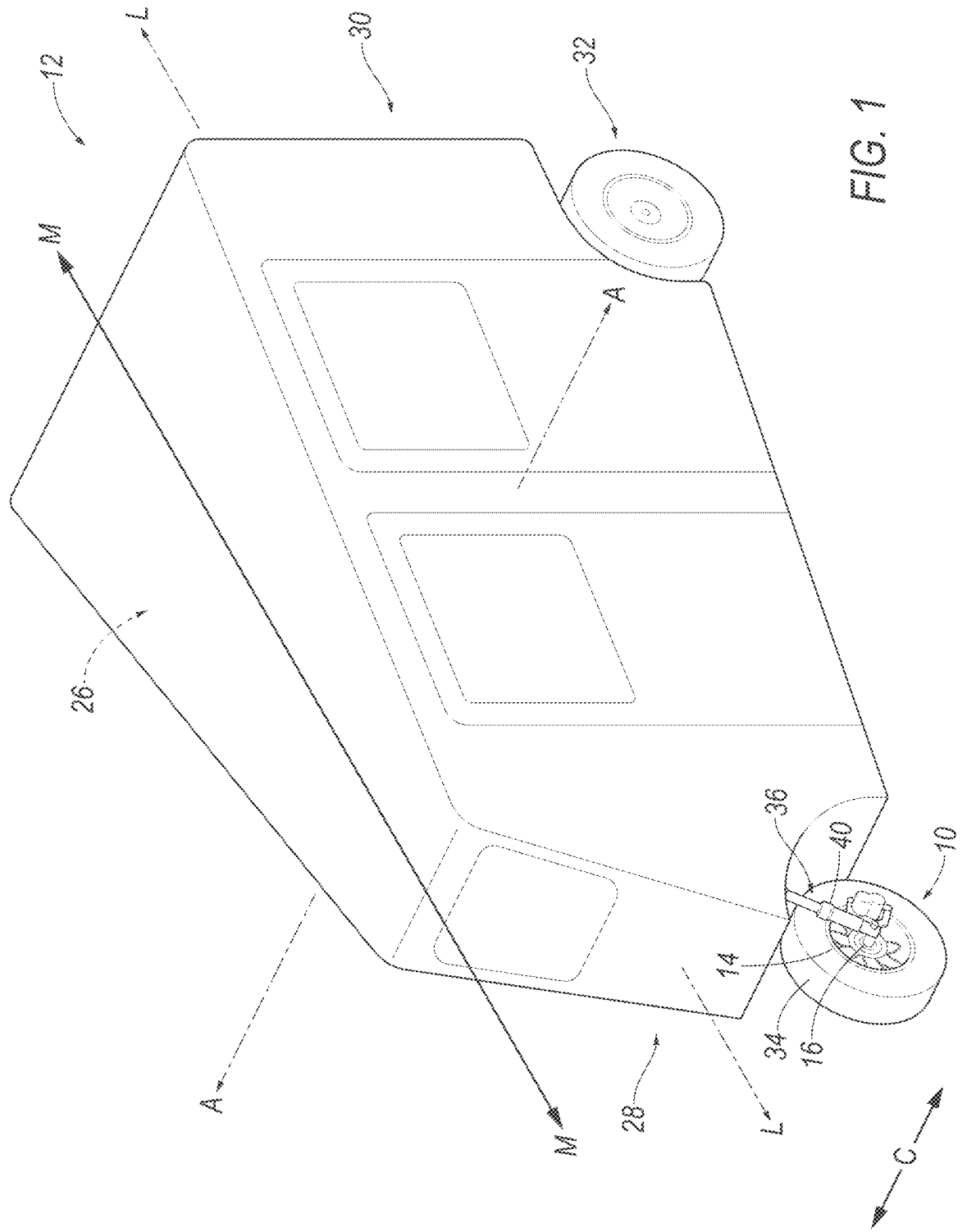
FIG. 1 is a perspective view of a three-wheeled vehicle.

A wheel assembly includes a rim and a hub concentric with the rim. The wheel assembly includes a first set of spokes spaced circumferentially about the hub between the rim and the hub. The spokes of the first set of spokes each has an elliptical shape elongated in a direction radially from the hub to the rim. The wheel assembly includes a second set of spokes spaced circumferentially about the hub between the first set of spokes and the rim. The spokes of the second set of spokes each has a partial elliptical shape elongated in a direction radially from the hub to the rim. The spokes of the first set of spokes are in an alternating arrangement with spokes of the second set of spokes circumferentially about the hub.

Each spoke of the first set of spokes may be fixed to the rim and the hub and each spoke of the second set of spokes may be fixed to the rim and two adjacent spokes of the first set of spokes.

Each of the first set of spokes may extend radially away from the hub from a first vertex proximal to the hub to a second vertex distal to the hub. The first vertex may be fixed to the hub and the second vertex may be fixed to the rim.

The rim may be tangential to each spoke of the first set of spokes at the second vertex and the hub may be tangential to each spoke of the first set of spokes at the first vertex.

Each spoke of the second set of spokes may include a third vertex and the rim may be tangential to each spoke of the second set of spokes at the third vertex.

The spokes of the first set of spokes may have a hollow oval shape and the spokes of the second set of spokes may have a hollow partial-oval shape.

The spokes of the first set of spokes may have a hollow oval shape and the spokes of the second set of spokes may have a hollow partial-oval shape.

The spokes of the first set of spokes may have a hollow oval shape having a major axis and a vertex on the major axis of the oval shape and the spokes of the second set of spokes may have a hollow partial-oval shape having a major axis and a vertex on the major axis of the partial-oval shape. The vertices of the spokes of the first set of spokes and the second set of spokes may be fixed to the rim.

The spokes of the second set of spokes may have ends spaced from the vertex of the partial-oval shape. The ends of each spoke of the second set of spokes may be fixed to two adjacent ones of the spokes of the first set of spokes between the hub and the rim.

Each spoke of the first set of spokes and the second set of spokes may be designed to collapse along its major axis when a compressive force above a predetermined level is applied to the spoke along its major axis. Each spoke of the first set of spokes and the second set of spokes may be designed to expand along a minor axis perpendicular to its major axis during collapse along its major axis.

Each spoke of the first set of spokes and the second set of spokes may be designed to elongate along its major axis during collapse along its minor axis.

A vehicle includes a vehicle frame and a wheel supported by the vehicle frame. The wheel is rotatable relative to the vehicle frame. The wheel has a rim and a hub concentric with the rim. The wheel has a first set of spokes spaced circumferentially about the hub between the rim and the hub, the spokes of the first set of spokes each having an elliptical shape elongated in a direction radially from the hub to the rim. The wheel have a second set of spokes spaced circumferentially about the hub between the first set of spokes and the rim. The spokes of the second set of spokes each have a partial elliptical shape elongated in a direction radially from the hub to the rim. The spokes of the first set of spokes are in an alternating arrangement with spokes of the second set of spokes circumferentially about the hub.

Each spoke of the first set of spokes may be fixed to the rim and the hub and each spoke of the second set of spokes may be fixed to the rim and two adjacent spokes of the first set of spokes.

Each of the first set of spokes may extend radially away from the hub from a first vertex proximal to the hub to a second vertex distal to the hub. The first vertex being fixed to the hub and the second vertex being fixed to the rim.

The rim may be tangential to each spoke of the first set of spokes at the second vertex and the hub may be tangential to each spoke of the first set of spokes at the first vertex.

The spokes of the first set of spokes may have a hollow oval shape and the spokes of the second set of spokes may have a hollow partial-oval shape.

The spokes of the first set of spokes may have a hollow oval shape having a major axis and a vertex on the major axis of the oval shape. The spokes of the second set of spokes may have a hollow partial-oval shape having a major axis and a vertex on the major axis of the partial-oval shape. The vertices of the spokes of the first set of spokes and the second set of spokes may be fixed to the rim.

The spokes of the second set of spokes may have ends spaced from the vertex of the partial-oval shape. The ends of each spoke may be fixed to two adjacent ones of the spokes of the first set of spokes between the hub and the rim.

Each spoke of the first set of spokes and the second set of spokes may be designed to collapse along its major axis when a compressive force above a predetermined level is applied to the spoke along its major axis. Each spoke of the first set of spokes and the second set of spokes may be designed to expand along a minor axis perpendicular to its major axis during collapse along its major axis.

Each spoke of the first set of spokes and the second set of spokes may be designed to elongate along its major axis during collapse along its minor axis.

With reference to the Figures, wherein like numerals indicate like parts throughout the several views, a wheel assembly 10 for a vehicle 12, specifically a front wheel 10 of a three-wheeled vehicle 12, includes a rim 14 and a hub 16 concentric with the rim 14. The wheel assembly 10 includes a first set of spokes 18 spaced circumferentially about the hub 16 between the rim 14 and the hub 16. The spokes 22 of the first set of spokes 18 each has an elliptical shape elongated in a direction radially from the hub 16 to the rim 14. The wheel assembly 10 includes a second set of spokes 20 spaced circumferentially about the hub 16 between the first set of spokes 18 and the rim 14. The spokes 24 of the second set of spokes 20 each has a partial elliptical shape elongated in a direction radially from the hub 16 to the rim 14. The spokes 22 of the first set of spokes 18 are in an alternating arrangement with spokes 24 of the second set of spokes 20 circumferentially about the hub 16.

The spokes 22 of the first set of spokes 18 and the spokes 24 of the second set of spokes 20 may manage deformation into the three-wheeled vehicle 12 during certain vehicle impacts, i.e., when a force above a predetermined level during certain vehicle impacts is applied to the wheel assembly 10. The elliptical shape and the partial elliptical shape may collapse and expand in controlled directions to allow management of deformation into the three-wheeled vehicle 12 in the event of certain vehicle impacts.

With reference to FIG. 1, the three-wheeled vehicle 12 may be any suitable type of ground vehicle, e.g., a passenger or commercial automobile. For example, the three-wheeled vehicle 12 may be any suitable type of ground vehicle, e.g., a motorized tricycle, auto rickshaw, tuk, etc. As shown in the Figures, the three-wheeled vehicle 12 may be a motorcycle-based vehicle.

The three-wheeled vehicle 12 defines a vehicle-longitudinal axis L extending between a front vehicle end 28 and a rear vehicle end 30 of the three-wheeled vehicle 12. The three-wheeled vehicle 12 defines a cross-vehicle axis A extending cross-vehicle from one side to the other side of the vehicle. A cross-vehicle direction C is parallel to the cross-vehicle axis A. The three-wheeled vehicle 12 defines a vehicle vertical axis (not labeled). The vehicle-longitudinal axis L, the cross-vehicle axis A, and the vehicle vertical axis are perpendicular relative to each other.

The three-wheeled vehicle 12 includes a vehicle frame 26 and a vehicle body (not numbered). The vehicle frame 26 may be of a unibody construction in which the vehicle frame 26 is unitary with the vehicle body including frame rails, pillars, roof rails, etc. As another example, the vehicle body and vehicle frame 26 may have a body-on-frame construction also referred to as a cab-on-frame construction in which the vehicle body and vehicle frame 26 are separate components, i.e., are modular, and the vehicle body is supported on and affixed to the frame. Alternatively, the vehicle frame 26 and vehicle body may have any suitable construction. The frame and vehicle body may be of any suitable material, for example, steel, aluminum, and/or fiber-reinforced plastic, etc.

The three-wheeled vehicle 12 may house one or more occupants. Specifically, the vehicle frame 26 defines an occupant compartment (not shown) to house one or more occupants of the three-wheeled vehicle 12. The occupant compartment may extend across the three-wheeled vehicle 12, i.e., from one side to the other side of the three-wheeled vehicle 12. The occupant compartment may extend from the front vehicle end 28 to the rear vehicle end 30 with the front vehicle end 28 being in front of the rear vehicle end 30 during forward motion of the three-wheeled vehicle 12. The three-wheeled vehicle 12 may accommodate one or more occupants. For example, as shown in the Figures, the three-wheeled vehicle 12 may accommodate more than one occupant, e.g., two or three occupants. In other examples not shown in the Figures, the three-wheeled vehicle 12 may accommodate a single occupant. In other words, the occupant compartment is sized and shaped to house only one occupant.

The three-wheeled vehicle 12 may define a midline M elongated along the vehicle-longitudinal axis L, i.e., vehicle fore-and-aft. The midline M of the vehicle frame 26 may be spaced equidistantly from each side of the three-wheeled vehicle 12. In other words, the midline M is in the middle of the vehicle frame 26. The vehicle frame 26 is elongated along the midline M and the vehicle-longitudinal axis L. Specifically, the vehicle frame 26 is elongated from the front vehicle end 28 to the rear vehicle end 30 along the midline M and the vehicle-longitudinal axis L.

With continued reference to FIG. 1, the three-wheeled vehicle 12 may include body panels (not numbered). The body panels may be supported by the vehicle frame 26. Specifically, the body panels may be fixed to the vehicle frame 26. The body panels may be fixed to the vehicle frame 26 in any suitable manner, e.g., fasteners, welding, etc. The three-wheeled vehicle 12 may include any suitable number of body panels supported by the vehicle frame 26 at any suitable location of the three-wheeled vehicle 12. For example, the three-wheeled vehicle 12 may include a body panel supported by each side of the three-wheeled vehicle 12, a vehicle floor (not numbered), a vehicle roof (not numbered), etc. The body panels may be made of any suitable material, e.g., steel, aluminum, composite, plastic, etc.

The vehicle roof and the vehicle floor are spaced from each other. Specifically, the vehicle floor is spaced downwardly from the vehicle roof. The vehicle roof defines the upper boundary of the occupant compartment and may extend from the front vehicle end 28 of the occupant compartment to the rear vehicle end 30 of the occupant compartment.

The vehicle floor defines the lower boundary of the occupant compartment and may extend from the front vehicle end 28 of the occupant compartment to the rear vehicle end 30 of the occupant compartment. The vehicle floor may include upholstery, for example, carpet, and may have a class-A surface facing the occupant compartment, i.e., a surface specifically manufactured to have a high quality, finished, aesthetic appearance free of blemishes.

The vehicle frame 26 may extend from the front vehicle end 28 to the rear vehicle end 30. The rear vehicle end 30 may be wider than the front vehicle end 28. Because the vehicle frame 26 is wider at the rear vehicle end 30 than at the front vehicle end 28, more occupants may be able to be housed at the rear vehicle end 30 of the vehicle frame 26 and occupant compartment.

The vehicle frame 26 may include any suitable number of members (not all shown) to define a shape of the three-wheeled vehicle 12. For example, as shown in the Figures, the vehicle frame 26 may include a first post (not shown) and a second post (not shown) spaced cross-vehicle from each other at the front vehicle end 28. The vehicle frame 26 may include a cross-member (not shown) extending from the first post to the second post.

Figure 2:
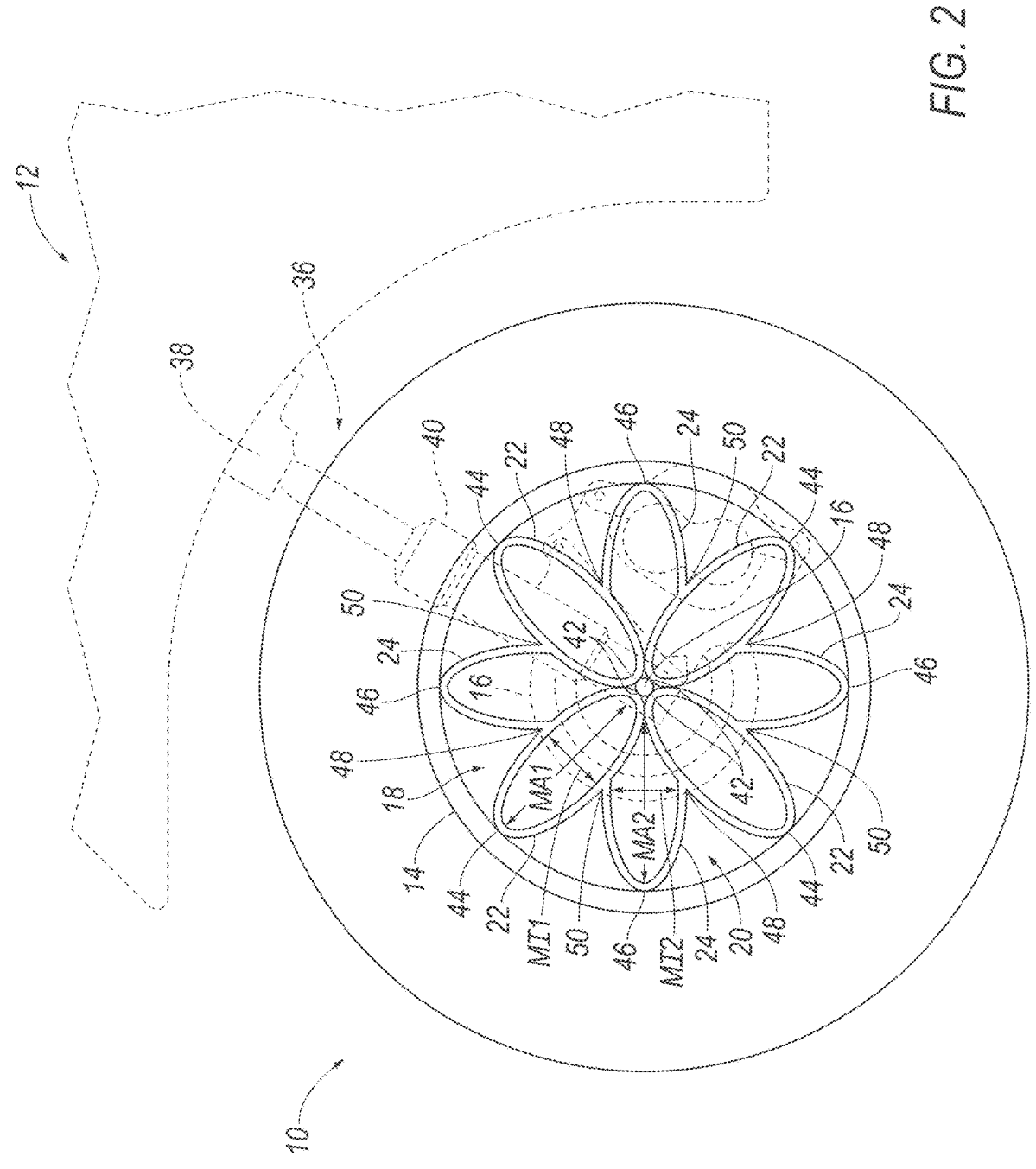
FIG. 2 is a side view of a front wheel of the three-wheeled vehicle.

As shown in FIG. 2, the three-wheeled vehicle 12 includes one or more wheel assemblies 10, 32 (hereinafter referred to as a "front wheel 10" or a "rear wheel 32"). Specifically, the three-wheeled vehicle 12 includes a single front wheel 10 and two rear wheel 32. The front wheel 10 is disposed vehicle-forward of the front vehicle end 28 of the occupant compartment and the rear wheel 32 are disposed adjacent the rear vehicle end 30. In other words, the front wheel 10 is disposed at the front vehicle end 28 and the rear wheel 32 are disposed at the rear vehicle end 30. The front wheel 10 and rear wheel 32 are supported by the vehicle frame 26. Specifically, the front wheel 10 is supported by the vehicle frame 26 vehicle-forward of the front vehicle end 28 and the rear wheel 32 are supported by the vehicle frame 26 adjacent the rear vehicle end 30. The front wheel 10 is disposed at the midline M. In other words, the front wheel 10 is spaced equidistantly from each side of the three-wheeled vehicle 12 in the cross-vehicle direction C. The rear wheel 32 may be disposed on each side of the three-wheeled vehicle 12 at the rear vehicle end 30 of the three-wheeled vehicle 12. In other words, the rear wheel 32 are spaced cross-vehicle from each other. The three-wheeled vehicle 12 may include a rear wheel 32 on each side of the midline M of the three-wheeled vehicle 12.

The front wheel 10 and the two rear wheel 32 are rotatable relative to the vehicle frame 26. Each front wheel 10 includes the rim 14 elongated along the vehicle-longitudinal axis L, the hub 16 about which the wheels rotate that is concentric with the rim 14, a plurality of spokes 22, 24 spaced circumferentially about the hub 16 between the hub 16 to the rim 14, and a tire 34 fitted about the rim 14. The spokes, specifically of the front wheel 10, i.e., the first set of spokes 18 and the second set of spokes 20, will be described further below. The front wheel 10 and the rear wheel 32 may rotate about an axle (not shown) supported by the vehicle frame 26 that extends through the hub 16. In other words, the hub 16, the rim 14, and the tire 34 rotate about the axle to allow the wheels to rotate relative to the vehicle frame 26. The axle is supported by the vehicle frame 26 in any suitable way, e.g., fasteners, welding, etc. As described further below, the axle is coupled to a steering system 36 to allow the front wheel 10 to be steered by an occupant.

The three-wheeled vehicle 12 may include any suitable number of subsystems (not numbered) coupled to one or more of the front wheel 10 and the rear wheel 32. For example, the three-wheeled vehicle 12 may include a suspension system that absorbs and dampens shocks and vibrations from the wheels, a braking system that decelerates the three-wheeled vehicle 12, a powertrain to drive the front wheel 10 or the rear wheel 32, the steering system 36 as described further below, and/or any other suitable subsystems.

With continued reference to FIG. 2, the three-wheeled vehicle 12 includes the steering system 36 positioned at the front vehicle end 28. The steering system 36 is coupled to the front wheel 10 to allow an occupant to steer the three-wheeled vehicle 12 as the three-wheeled vehicle 12 is in motion. The steering system 36 is rotatably supported by the vehicle frame 26 to steer the three-wheeled vehicle 12. The steering system 36 is elongated upwardly from the hub 16 and the axle of the front wheel 10 to a steering device (not shown) inside the occupant compartment, e.g., handle-bars, a steering wheel, etc. In other words, the steering system 36 is elongated upwardly from the hub 16 and the axle and into the occupant compartment to allow the occupant to have access to the steering device inside the occupant compartment. The steering system 36 is aligned with the midline M of the three-wheeled vehicle 12. In other words, the steering system 36 may be positioned between the first post and the second post of the vehicle frame 26.

The steering system 36 includes the steering post (not shown), a crossbar 38, and a pair of beams 40. The steering device is supported by the steering post. Specifically, the steering device extends downwardly from the steering device to the crossbar 38. The steering post may be elongated along an axis (not shown). The steering post may be aligned with the midline M of the three-wheeled vehicle 12. In other words, the steering post may be between the first post and the second post.

The steering post is rotatably supported by the vehicle frame 26. In other words, the steering post is rotatable relative to the vehicle frame 26. Specifically, the steering post is rotatable about the axis elongated along the steering post. When an occupant turns the three-wheeled vehicle 12, the occupant turns the steering device in the desired direction, e.g., clockwise or counterclockwise, and the steering post rotates about the axis in the desired direction. Turning the steering device turns the steering post to allow the three-wheeled vehicle 12 to turn right or left during forward and rearward motion of the three-wheeled vehicle 12.

The steering post is connected to the front wheel 10 such that when an occupant turns the steering device, the steering post rotates to turn the front wheel 10 in the desired direction of the occupant. As in the example shown in the Figures, the steering post is indirectly connected to the front wheel 10. In other words, other components, for example the crossbar 38 and beams 40 as described below, may be between the steering post and the front wheel 10 such that when the steering post rotates about the axis, the front wheel 10 rotates in the desired direction of the occupant.

The crossbar 38 is supported by the steering post. In other words, the crossbar 38 is connected to the steering post. Specifically, the crossbar 38 is fixed to the steering post. As an occupant is turning the three-wheeled vehicle 12, the occupant may rotate the steering device which rotates the steering post about the axis. As the steering post rotates about the axis, the crossbar 38 rotates about the axis. In other words, both the steering post and the crossbar 38 rotate about the axis as a unit.

The steering system 36 includes a pair of beams 40. Each of the beams 40 of the steering system 36 extend downwardly from the crossbar 38. In other words, the beams 40 are elongated from the crossbar 38 toward the front wheel 10. Specifically, one of the beams 40 is elongated downwardly from the crossbar 38 with the steering post being between the beams 40.

The beams 40 are coupled to the front wheel 10. In other words, the beams 40 extend from the crossbar 38 to the front wheel 10. Specifically, the beams 40 extend from the crossbar 38 to the hub 16 and axle of the front wheel 10. One of the beams 40 is on one side of the front wheel 10 and the other beam 40 is on the other side of the front wheel 10. In other words, the front wheel 10 is between the beams 40. Each of the beams 40 is coupled to the axle of the front wheel 10. In other words, the beams 40 are on both sides of the front wheel 10 and connected to the axle on each side of the front wheel 10. The beams 40 may be included in or connected to the braking system and/or the suspension system of the front wheel 10.

Figures 3A, 3B:
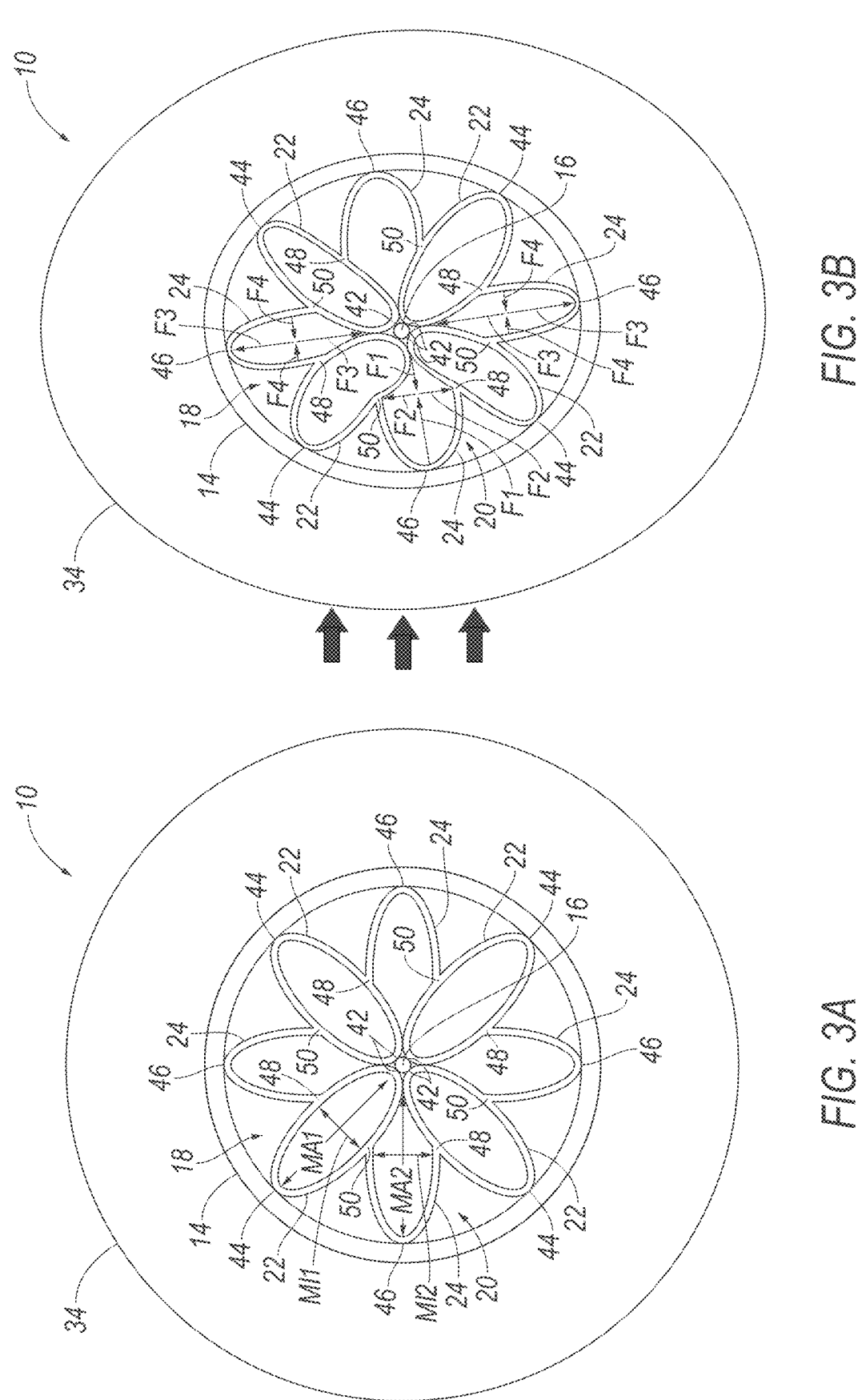
FIGS. 3A-3E is a side view representation of a progression of deformation of the spokes of the front wheel in the event of certain vehicle impacts.
Figures 3C, 3D, 3E:
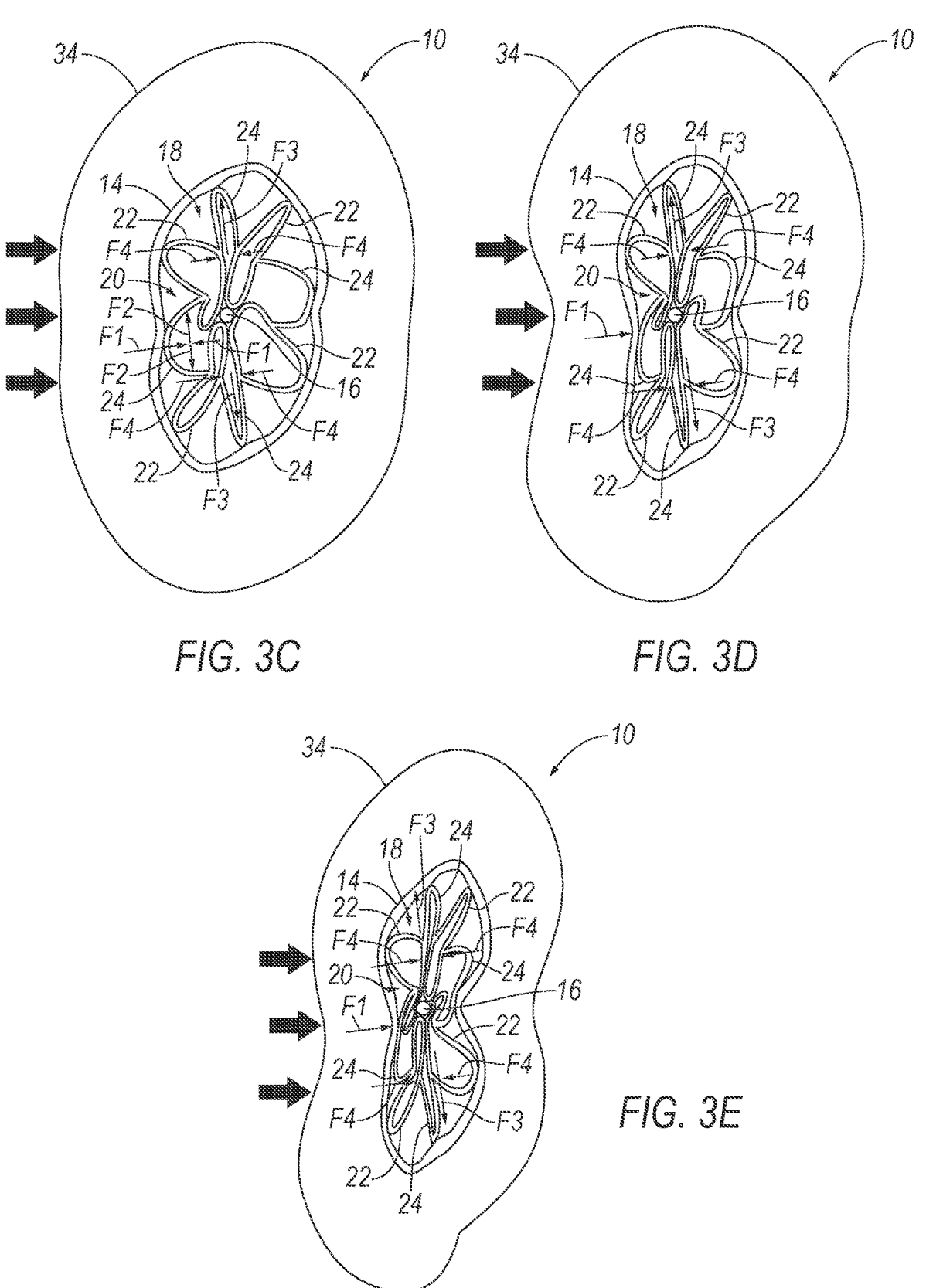

With reference to FIGS. 2-3E, as discussed above, the front wheel 10 includes a plurality of spokes 22, 24 spaced about the hub 16. Specifically, the front wheel 10 includes two sets of spokes 18, 20 spaced about the hub 16. The front wheel 10 includes the first set of spokes 18 and the second set of spokes 20 spaced about the hub 16. The spokes 22 of the first set of spokes 18 a spaced from each other circumferentially about the hub 16 between the rim 14 and the hub 16 and the spokes 24 of the second set of spokes 20 are spaced from each other circumferentially about the hub 16 from the first set of spokes 18 to the rim 14. In other words, each of the first set of spokes 18 and the second set of spokes 20 includes a plurality of spokes 22, 24 that are spaced from each other around the hub 16. The spokes 22, 24 are in alternating arrangement about the hub 16. The spokes 22 of the first set of spokes 18 and the spokes 24 of the second set of spokes 20 are between the hub 16 and the rim 14. Specifically, as described further below, the spokes 22 of the first set of spokes 18 and the spokes 24 of the second set of spokes 20 are elongated in the direction radially from the hub 16 to the rim 14. The spokes 22 of the first set of spokes 18 and the spokes 24 of the second set of spokes 20 deform in the event of certain vehicle impacts to the three-wheeled vehicle 12. The spokes 22 of the first set of spokes 18 and the spokes 24 of the second set of spokes 20 may manage deformation into the three-wheeled vehicle 12 during certain vehicle impacts, i.e., when a force above a predetermined level during certain vehicle impacts is applied to the front wheel 10.

Each of the spokes 22 of the first set of spokes 18 extend from the hub 16 to the rim 14. Specifically, the spokes 22 of the first set of spokes 18 are elongated from the hub 16 to the rim 14. The spokes 22 of the first set of spokes 18 are each elongated in the direction radially from the hub 16 to the rim 14. In other words, the spokes 22 of the first set of spokes 18 are elongated along a radius of the rim 14 from the hub 16 to the rim 14. The spokes 22 are elongated away from the hub 16 to the rim 14.

The spokes 22 of the first set of spokes 18 each have an elliptical shape. In other words, the spokes 22 of the first set of spokes 18 have a hollow oval shape. Specifically, the spokes 22 of the first set of spokes 18 are empty in the middle of the spokes, i.e., no material exists at the center of the spokes. The spokes 22 of the first set of spokes 18 may each have a first major axis MA1 and a first minor axis MI1 perpendicular to the first major axis MA1. The first major axis MA1 and the first minor axis MI1 intersect at a center of the spokes. The elliptical shape, i.e., the hollow oval shape, is elongated in the direction radially from the hub 16 to the rim 14. Specifically, the first major axis MA1 extends radially from the hub 16 to the rim 14. In other words, the first major axis MA1 is elongated along the radius of the rim 14 from the hub 16 to the rim 14. The first major axis MA1 is longer in length than the first minor axis MI1. In other words, a length of the spokes 22 of the first set of spokes 18 is defined by the first major axis MA1 and a width of the spokes 22 of the first set of spokes 18 is defined by the first minor axis MI1.

Each of the spokes 22 of the first set of spokes 18 includes a first vertex 42 and a second vertex 44 of the elliptical shape, specifically, the hollow oval shape. The spokes 22 of the first set of spokes 18 are fixed to the hub 16 and to the rim 14. Specifically, the first vertex 42 is fixed to the hub 16 and the second vertex 44 is fixed to the hub 16. In other words, the first vertex 42 is proximal to the hub 16 and the second vertex 44 is distal to the hub 16. Said another way, the first vertex 42 is distal to the rim 14 and the second vertex 44 is proximal to the rim 14. As discussed above, each of the spokes 22 of the first set of spokes 18 extends radially, i.e., along the radius of the rim 14, from the hub 16 to the rim 14. Specifically, the spokes 22 extend radially away from the hub 16 from the first vertex 42 to the second vertex 44.

The rim 14 is tangential to each spoke 22 of the first set of spokes 18 at the second vertex 44 and the hub 16 is tangential to each spoke 22 of the first set of spokes 18 at the first vertex 42. In other words, each spoke 22 of the first set of spokes 18 contacts each of the rim 14 and the hub 16 at a single point, the first vertex 42 and the second vertex 44. The spokes 22 of the first set of spokes 18 only contact the rim 14 and the hub 16 at the first vertex 42 and the second vertex 44. The remaining portions of the elliptical shape are elongated between the rim 14 and the hub 16.

With continued reference to FIGS. 2-3E, the first major axis MA1 extends from the first vertex 42 to the second vertex 44. Specifically, the first vertex 42 and the second vertex 44 are each on the first major axis MA1. The length of the spokes 22 is defined by the distance between the first vertex 42 and the second vertex 44. The first minor axis MIL is spaced equidistantly from the first vertex 42 and the second vertex 44. Specifically, the center of each of the spokes 22 of the first set of spokes 18 is spaced equidistantly from the first vertex 42 and the second vertex 44.

As discussed above, the spokes 24 of the second set of spokes 20 are spaced circumferentially about the hub 16 between the first set of spokes 18 and the rim 14. Each of the spokes 24 of the second set of spokes 20 extends from the spokes 22 of the first set of spokes 18 to the rim 14. Specifically, the spokes 24 of the second set of spokes 20 are elongated from the spokes 22 of the first set of spokes 18 to the rim 14. The spokes 24 of the second set of spokes 20 are each elongated in the direction radially from the hub 16 to the rim 14. In other words, the spokes 24 of the second set of spokes 20 are elongated along the radius of the rim 14 from the spokes 22 of the first set of spokes 18 to the rim 14. The spokes 24 are elongated away from the spokes 22 of the first set of spokes 18 to the rim 14.

The spokes 24 of the second set of spokes 20 each have a partial elliptical shape. In other words, the spokes 24 of the second set of spokes 20 have a hollow partial-oval shape. By partial, the partial elliptical shape and the hollow partial-oval shape means that the shape of the partial elliptical shape and the hollow partial-oval shape are only part of an ellipse and oval, not an entire oval. As shown in the Figures, the spokes 24 of the second set of spokes 20 are empty in the middle of the spokes, i.e., no material exists at a center of the spokes. The spokes 24 of the second set of spokes 20 may each have a second major axis MA2 and a second minor axis MI2 perpendicular to the second major axis MA2. The second major axis MA2 and the second minor axis MI2 intersect at a center of the spokes 24 of the second set of spokes 20. The partial elliptical shape, i.e., the hollow partial-over shape, is elongated in the direction radially from the hub 16 to the rim 14. Specifically, the second major axis MA2 extends radially from the hub 16 to the rim 14. In other words, the second major axis MA2 is elongated along the radius of the rim 14 from the hub 16 to the rim 14. The second major axis MA2 is longer in the length than the second minor axis MI2. In other words, the length of the spokes 24 of the second set of spokes 20 is defined by the second major axis MA2 and the width of the spokes 24 of the second set of spokes 20 defined by the second minor axis MI2.

Each of the spokes 24 of the second set of spokes 20 includes a third vertex 46 and ends 48, 50, for example a first end 48 and a second end 50, spaced from the third vertex 46 of the partial elliptical shape, specifically, the hollow partial-oval shape. The spokes 24 of the second set of spokes 20 are fixed to the rim 14 and two adjacent spokes 22 of the first set of spokes 18. As discussed further below, the spokes 22 of the first set of spokes 18 and the spokes 24 of the second set of spokes 20 are in alternating arrangement. The third vertex 46 is fixed to the rim 14. Each of the third vertices 46 of the spokes 24 of the second set of spokes 20 is spaced from the second vertices 44 of the spokes 22 of the first set of spokes 18. Specifically, the third vertices 46 are spaced from the second vertices 44 along the rim 14. The first end 48 and the second end 50 are fixed to two spokes 22 of the first set of spokes 18. The first end 48 and the second end 50 of each of the spokes 24 of the second set of spokes 20 is fixed to two adjacent ones of the spokes 22 of the first set of spokes 18 between the hub 16 and the rim 14. As discussed above, each of the spokes 24 of the second set of spokes 20 extends radially, i.e., along the radius of the rim 14 from the first set of spokes 18 to the rim 14. Specifically, the spokes 24 extend radially away from the first set of spokes 18 from the ends 48, 50 to the third vertex 46.

The rim 14 is tangential to each spoke 24 of the second set of spokes 20 at the third vertex 46. In other words, each spoke 24 of the second set of spokes 20 contacts the rim 14 at a single point. The spokes 24 of the second set of spokes 20 only contact the rim 14 at the third vertex 46. The remaining positions of the partial elliptical shape are elongated along between the rim 14 and the hub 16.

The second major axis MA2 extends from the third vertex 46 to the hub 16. Specifically, the third vertex 46 is on the second major axis MA2. The length of the spokes 24 of the second set of spokes 20 is defined by the distance between the third vertex 46 and the hub 16. The second minor axis MI2 is spaced equidistantly from the third vertex 46 and the hub 16. Specifically, the center of each of the spokes 24 of the second set of spokes 20 from the third vertex 46 and the hub 16. In some examples, the second minor axis MI2 may extend from the first end 48 to the second end 50. In other examples, the second minor axis MI2 may be spaced along the second major axis MA2 from the first end 48 and the second end 50.

With continued reference to FIGS. 2-3E, the spokes 22 of the first set of spokes 18 are in alternating arrangement with spokes 24 of the second set of spokes 20 circumferentially about the hub 16. In other words, each of the spokes 22 of the first set of spokes 18 is between two spokes 24 of the second set of spokes 20 and each of the spokes 24 of the second set of spokes 20 is between two of the spokes 22 of the first set of spokes 18 around the entire circumference of the of the hub 16. Each of the third vertices 46 is between two second vertices 44 along the rim 14 and each of the second vertices 44 is between two third vertices 46 along the rim 14. In the example shown in the Figures, the front wheel 10 includes four spokes 22 of the first set of spokes 18 and four spokes 24 of the second set of spokes 20. The front wheel 10 may include any suitable number of spokes 22, 24 of both the first set of spokes 18 and the second set of spokes 20.

The spokes 22 of the first set of spokes 18 and the spokes 24 of the second set of spokes 20 deform in the event of certain impacts to the three-wheeled vehicle 12. The spokes 22 of the first set of spokes 18 and the spokes 24 of the second set of spokes 20 may manage deformation into the three-wheeled vehicle 12 during certain vehicle impacts, i.e., when a force above a predetermined level during certain vehicle impacts is applied to the front wheel 10. As the rim 14 rotates about the axle, the spokes 22, 24 may be located at a different radial positions about the axle at any given time during the rotation. The spokes 22, 24 may deform differently depending on the radial location of the spokes 22, 24 relative to a force from certain vehicle impacts.

The spokes 22, 24 of the first set of spokes 18 and the second set of spokes 20 are designed to collapse along the major axes MA1, MA2 and expand along the minor axes MI1, MI2 when a deformation force above a predetermined level is applied to the front wheel 10 and the deformation force is along the major axes MA1, MA2. Specifically, as shown in the example in FIGS. 3A-3E, when a compressive deformation force above the predetermined level is applied along the vehicle-longitudinal axis L and aligned with the midline M of the three-wheeled vehicle 12, each spoke 22 of the first set of spokes 18 and the second set of spokes 20 is designed to collapse along the major axes MA1, MA2 when the major axes MA1, MA2 are elongated along the midline M, e.g., when the major axes MA1, MA2 are horizontal. In other words, when the compressive deformation force is applied along the major axes MA1, MA2, the spokes 22 of the first set of spokes 18 and the spokes 24 of the second set of spokes 20 are designed to collapse along the major axes MA1, MA2. The vertices 42, 44 of the first set of spokes 18 may move closer to each other and the third vertex 46 of the second set of spokes 20 may move closer to the hub 16. As the spokes 22 of the first set of spokes 18 and the second set of spokes 20 collapse along the major axes MA1, MA2 from the deformation force along the major axes MA1, MA2, each spoke 22, 24 is designed to expand along the minor axes MI1, MI2 perpendicular to the major axes MA1, MA2. In other words, sides of the elliptical and partial elliptical shapes may move away from each other, i.e., the minor axes MI1, MI2 become longer. Force vectors F1 along the major axes MA1, MA2 and force vectors F2 along the minor axes MI1, MI2 are shown in FIG. 3B.

The spokes 22, 24 of the first set of spokes 18 and the second set of spokes 20 are designed to elongate along the major axes MA1, MA2 when the deformation force above a predetermined level is applied to the front wheel 10 and the deformation force is transverse to the major axes MA1, MA2, for example when the deformation force is applied along the minor axes MI1, MI2, e.g., when the major axes MA1, MA2 are vertical. When the spokes 22, 24 elongate along the major axes MA1, MA2, the spokes 22, 24 collapse along the minor axes MI1, MI2. In other words, when the spokes 22, 24 collapse along the minor axes MI1, MI2 when the deformation force is applied along the minor axes MI1, MI2. As the minor axes MI1, MI2 collapse, depending on whether the spoke 22, 24 is of the first set of spokes 18 or the second set of spokes 20, the sides of the ellipses or the partial ellipses move toward each other, the first vertex 42 and second vertex 44 move away from each other, and/or the third vertex 46 moves away from the hub 16. Force vectors F3 along the major axes MA1, MA2 and force vectors F4 along the minor axes MI1, MI2 are shown in FIG. 3B.

Figure 4A:
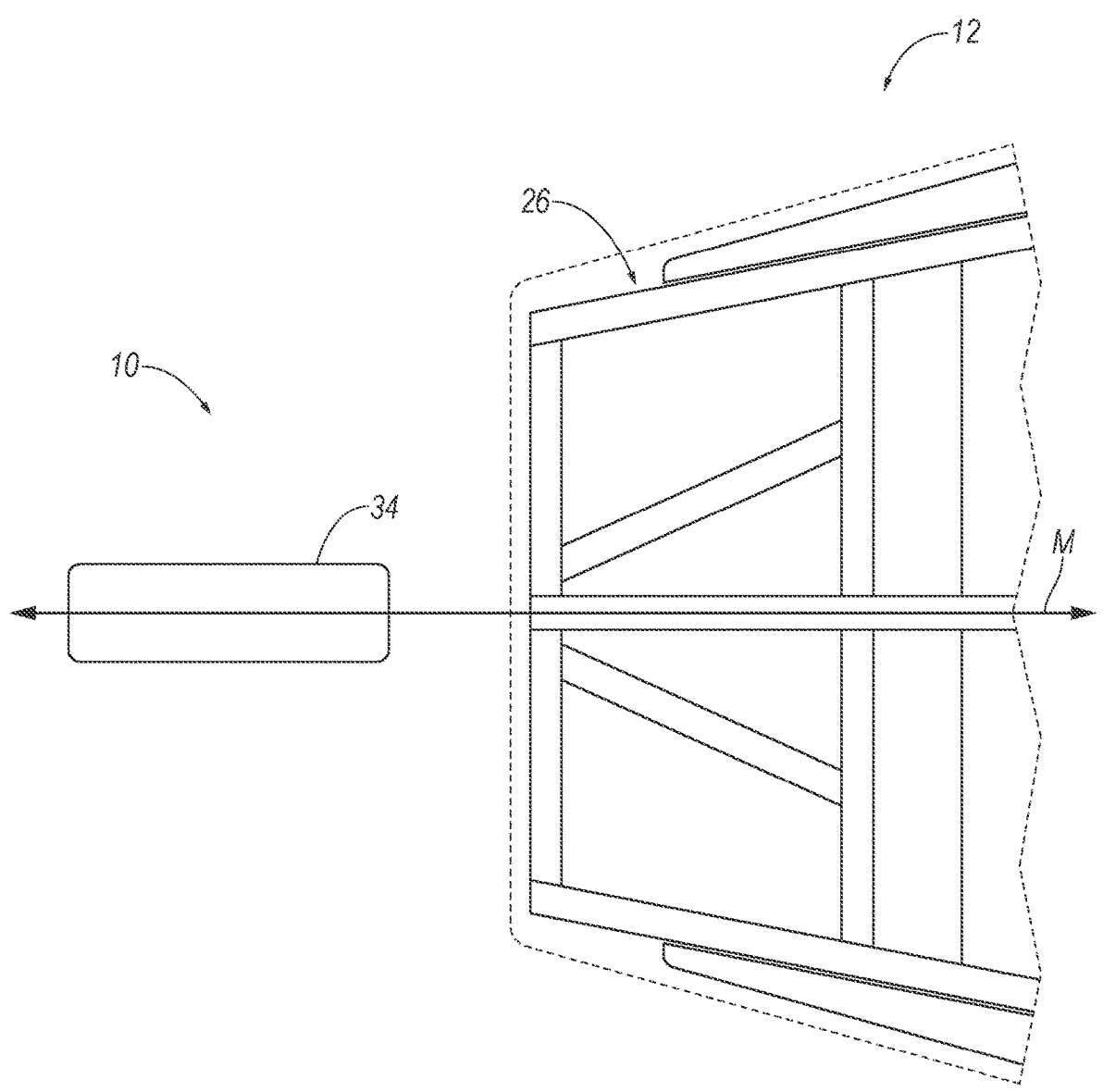
FIG. 4A is a bottom plane view of the front wheel and a vehicle frame of the three-wheeled vehicle prior to deformation from certain vehicle impacts.
Figure 4B:
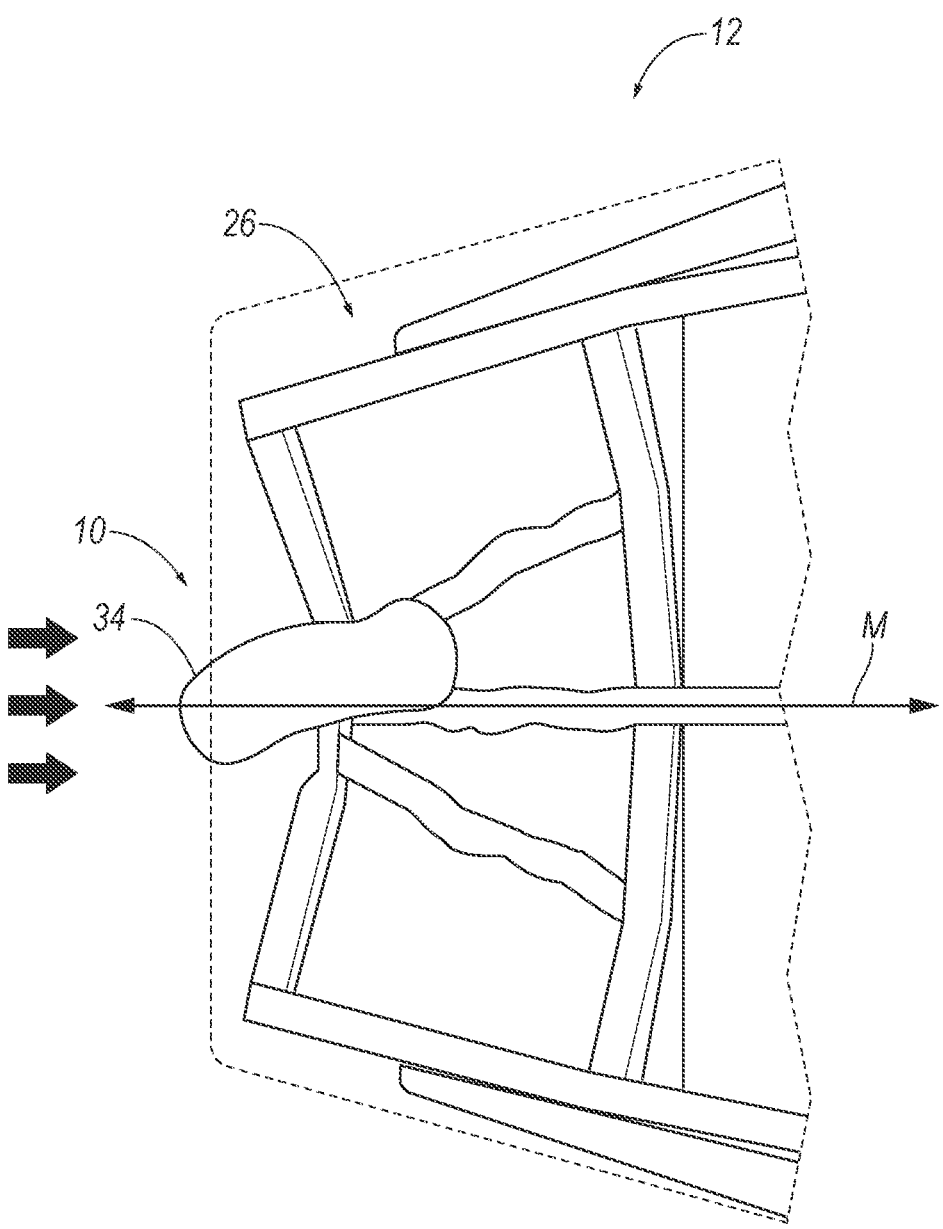
FIG. 4B is a bottom plane view of a representation of the front wheel and the vehicle frame of the three-wheeled vehicle after deformation from certain vehicle impacts.

When the deformation force is applied to the front wheel 10, the elongation and collapse of the spokes 22, 24 manages deformation into the three-wheeled vehicle 12. FIGS. 4A and 4B show the three-wheeled vehicle 12 prior to deformation and a representation of the three-wheeled vehicle 12 after deformation of the front wheel 10.

The disclosure has been described in an illustrative manner, and it is to be understood that the terminology which has been used is intended to be in the nature of words of description rather than of limitation. The numerical adverbs "first," "second," and "third" used herein are used merely as identifiers and do not signify order or importance. Many modifications and variations of the present disclosure are possible in light of the above teachings, and the disclosure may be practiced otherwise than as specifically described.

What is claimed is:

1. A wheel assembly comprising:
a rim;
a hub concentric with the rim;
a first set of spokes spaced circumferentially about the hub between the rim and the hub, the spokes of the first set of spokes each having an elliptical shape elongated in a direction radially from the hub to the rim; and
a second set of spokes spaced circumferentially about the hub between the first set of spokes and the rim, the spokes of the second set of spokes each having a partial elliptical shape elongated in a direction radially from the hub to the rim;
the spokes of the first set of spokes being in an alternating arrangement with spokes of the second set of spokes circumferentially about the hub;
each of the first set of spokes extending radially away from the hub from a first vertex proximal to the hub to a second vertex distal to the hub, the first vertex being fixed to the hub and the second vertex being fixed to the rim;
the rim being tangential to each spoke of the first set of spokes at the second vertex and the hub being tangential to each spoke of the first set of spokes at the first vertex; and
each spoke of the second set of spokes including a third vertex and the rim being tangential to each spoke of the second set of spokes at the third vertex.

2. The wheel assembly of claim 1, wherein each spoke of the second set of spokes is fixed to the rim and two adjacent spokes of the first set of spokes.

3. The wheel assembly of claim 1, wherein the spokes of the first set of spokes have a hollow oval shape and the spokes of the second set of spokes have a hollow partial-oval shape.

4. The wheel assembly of claim 1, wherein:
the spokes of the first set of spokes have a hollow oval shape having a major axis, the first vertex and the second vertex being on the major axis of the oval shape; and
the spokes of the second set of spokes have a hollow partial-oval shape having a major axis, the third vertex being on the major axis of the partial-oval shape; and
the the first vertices and the second vertices of the spokes of the first set of spokes and the third vertices of the second set of spokes being fixed to the rim.

5. The wheel assembly of claim 4, wherein the spokes of the second set of spokes have ends spaced from the third vertex, the ends of each spoke of the second set of spokes being fixed to two adjacent ones of the spokes of the first set of spokes between the hub and the rim.

6. The wheel assembly of claim 4, wherein:
each spoke of the first set of spokes and the second set of spokes is designed to collapse along its major axis when a compressive force above a predetermined level is applied to the spoke along its major axis; and
each spoke of the first set of spokes and the second set of spokes is designed to expand along a minor axis perpendicular to its major axis during collapse along its major axis.

7. The wheel assembly of claim 6, wherein each spoke of the first set of spokes and the second set of spokes is designed to elongate along its major axis during collapse along its minor axis.

8. A vehicle comprising:
a vehicle frame; and
a wheel supported by the vehicle frame, the wheel being rotatable relative to the vehicle frame;
the wheel having a rim and a hub concentric with the rim;
the wheel having a first set of spokes spaced circumferentially about the hub between the rim and the hub, the spokes of the first set of spokes each having an elliptical shape elongated in a direction radially from the hub to the rim;
the wheel having a second set of spokes spaced circumferentially about the hub between the first set of spokes and the rim, the spokes of the second set of spokes each having a partial elliptical shape elongated in a direction radially from the hub to the rim; and
the spokes of the first set of spokes being in an alternating arrangement with spokes of the second set of spokes circumferentially about the hub;
each of the first set of spokes extending radially away from the hub from a first vertex proximal to the hub to a second vertex distal to the hub, the first vertex being fixed to the hub and the second vertex being fixed to the rim;
the rim being tangential to each spoke of the first set of spokes at the second vertex and the hub being tangential to each spoke of the first set of spokes at the first vertex; and
each spoke of the second set of spokes including a third vertex and the rim being tangential to each spoke of the second set of spokes at the third vertex.

9. The vehicle of claim 8, wherein each spoke of the second set of spokes is fixed to the rim and two adjacent spokes of the first set of spokes.

10. The vehicle of claim 8, wherein the spokes of the first set of spokes have a hollow oval shape and the spokes of the second set of spokes have a hollow partial-oval shape.

11. The vehicle of claim 8, wherein:
the spokes of the first set of spokes have a hollow oval shape having a major axis, the first vertex and the second vertex being on the major axis of the oval shape; and
the spokes of the second set of spokes have a hollow partial-oval shape having a major axis, the third vertex being on the major axis of the partial-oval shape; and
the the first vertices and the second vertices of the spokes of the first set of spokes and the third vertices of the second set of spokes are fixed to the rim.

12. The vehicle of claim 11, wherein the spokes of the second set of spokes have ends spaced from the third vertex, the ends of each spoke being fixed to two adjacent ones of the spokes of the first set of spokes between the hub and the rim.

13. The vehicle of claim 11, wherein:
each spoke of the first set of spokes and the second set of spokes is designed to collapse along its major axis when a compressive force above a predetermined level is applied to the spoke along its major axis; and
each spoke of the first set of spokes and the second set of spokes is designed to expand along a minor axis perpendicular to its major axis during collapse along its major axis.

14. The vehicle of claim 13, wherein each spoke of the first set of spokes and the second set of spokes is designed to elongate along its major axis during collapse along its minor axis.

* * * * *